United States Patent [19]
Bosch et al.

[11] 4,399,267
[45] Aug. 16, 1983

[54] ORGANOPOLYSILOXANES HAVING RETARDED SKIN FORMATION

[75] Inventors: Erhard Bosch, Burghausen; Ingo Craubner, Munich; Norman Dorsch, Burghausen; August Schiller, Neuötting; Oswin Sommer, Burghausen, all of Fed. Rep. of Germany

[73] Assignee: Wacker-Chemie GmbH, Munich, Fed. Rep. of Germany

[21] Appl. No.: 401,809

[22] Filed: Jul. 26, 1982

[30] Foreign Application Priority Data

Aug. 25, 1981 [DE] Fed. Rep. of Germany ....... 3133564

[51] Int. Cl.$^3$ ............................................. C08G 77/22
[52] U.S. Cl. ..................................... 528/30; 427/387; 525/479; 528/18; 528/33; 528/34; 528/901
[58] Field of Search ....................... 528/18, 30, 33, 34, 528/901; 427/387; 525/479

[56] References Cited

U.S. PATENT DOCUMENTS 3,674,738  7/1972  Nitzsche et al. ............... 528/901
4,191,817  3/1980  Schiller et al. ................. 528/901

Primary Examiner—Melvyn I. Marquis

[57] ABSTRACT

The invention relates to organopolysiloxane compositions which are stable when stored under anhydrous conditions, but when exposed to moisture cure to an elastomer containing (a) a diorganopolysiloxane having terminal condensable groups, (b) a silicon compound having 3 amino groups bonded to silicon via nitrogen and/or oxime groups bonded to silicon via oxygen per molecule and (c) a silicon compound having at least one thiol group selected from mercapto-functional silanes or siloxanes. The presence of the mercapto-functional silanes or siloxanes substantially retards the formation of skin but does not substantially extend the cure time of the organopolysiloxanes compositions. These compositions are useful in, for example, screen printing, where a long skin-over time is desired.

12 Claims, No Drawings

ORGANOPOLYSILOXANES HAVING RETARDED SKIN FORMATION

The present invention relates to organopolysiloxane compositions and particularly to curable organopolysiloxane compositions in which the formation of skin on the surface has been substantially delayed. More particularly the organopolysiloxane compositions of this invention may be stored under anhydrous conditions, but when exposed to moisture, cure at room temperature to form elastomers.

BACKGROUND OF THE INVENTION

Organopolysiloxane compositions having such properties are described, for example, in U.S. Pat. No. 4,191,817 to Schiller et al. These compositions crosslink when they are exposed to atmospheric moisture. Generally, the crosslinking occurs initially at the surface of such compositions with the formation of an outer skin and then continues inward until the composition has completely vulcanized. These compositions are used for coatings, as adhesives and as sealants.

In contrast to the compositions described, for example, in U.S. Pat. No. 4,191,817, the compositions of this invention crosslink and form elastomers when exposed to moisture, however, formation of the outer skin has been substantially delayed while at the same time the cure rate is substantially the same as conventional room temperature curable compositions.

It has been found that by the addition of mercapto-functional silanes or siloxanes that the formation of skin on the surface of the room temperature curable compositions may be substantially delayed without substantially effecting the overall cure rate of the composition.

Therefore, it is an object of the present invention to provide a composition which cures in the presence of atmospheric moisture. Another object of the present invention is to provide a composition which is stable under anhydrous conditions, but cures to an elastomeric solid when exposed to atmospheric moisture. A further object of the present invention is to provide a composition in which the outer skin formation is retarded, but cures at a rate which is comparable to conventional organopolysiloxane compositions. A still further object of the present invention is to provide a composition which may be used in screen printing processes.

SUMMARY OF THE INVENTION

The foregoing objects and others which will become apparent from the following description are accomplished in accordance with this invention, generally speaking, by providing an organopolysiloxane composition which can be stored under anhydrous conditions, but when exposed to atmospheric moisture, crosslinks to form an elastomer which comprises (a) a diorganopolysiloxane having terminal condensable groups; (b) a silicon compound having at least 3 amino groups which are bonded to silicon via nitrogen and/or oxime groups which are bonded to silicon via oxygen per molecule and (c) a silicon compound having at least one thiol group per molecule which is bonded to silicon via carbon in which the silicon compound (c) is preferably present in an amount of from about 0.1 percent by weight to about 5 percent by weight, based on the total weight of the composition.

DETAILED DESCRIPTION OF THE INVENTION

The diorganopolysiloxanes having terminal condensable groups which are employed in the composition of this invention may be represented by the following formula $$A—(SiR^1_2O)_x—SiR^1_2A$$

wherein $R^1$ which may be the same or different represents monovalent hydrocarbon radicals, substituted monovalent hydrocarbon radicals and/or polymeric hydrocarbon radicals, A represents condensable groups and x is an integer having a value of at least 10.

Examples of suitable monovalent hydrocarbon radicals represented by $R^1$ are alkyl radicals, such as the methyl, ethyl, n-propyl and iso-propyl radical, as well as octadecyl radicals, alkenyl radicals such as the vinyl or the allyl radical, cycloaliphatic radicals, such as the cyclopentyl or cyclohexyl radical, as well as methylcyclohexyl or cyclohexenyl radicals; aryl radicals such as the phenyl radical or xenyl radical; aralkyl radicals such as the benzyl or the beta-phenylethyl or the beta-phenylpropyl radicals; as well as alkaryl radicals such as the toluyl radicals. Examples of substituted hydrocarbon radicals are the chlorophenyl radicals and the bromophenyl radicals or cyanoalkyl radicals such as the beta-cyanoethyl radical.

Examples of substituted polymeric or unsubstituted polymeric radicals represented by $R^1$ are those which may be obtained from the copolymerization of, for example, vinyl acetate, ethylene, styrene, acrylic acid, methacrylic acid, acrylic acid esters, such as n-propyl acrylate, methacrylic acid esters such as n-butyl methacrylate, acrylonitrile or methacrylonitrile, or mixtures of these monomers with diorganopolysiloxanes in the presence of free radicals.

Examples of terminal condensable groups represented by A are hydroxyl groups, amino groups which are bonded via nitrogen, oxime groups which are bonded via oxygen, alkoxy groups having from 1 to 5 carbon atoms or alkoxyalkyleneoxy groups having from 1 to 5 carbon atoms. The preferred terminal condensable groups are the hydroxyl groups.

The diorganopolysiloxanes (a) may be homopolymers or copolymers. Mixtures of several diorganopolysiloxanes having terminal condensable groups may be used.

It is preferred that at least 50 percent of the number of the SiC-bonded radicals of the diorganopolysiloxane be methyl radicals.

Also, it is preferred that the viscosity of the diorganopolysiloxanes range from about 100 to about 500,000 mPa.s at 25° C.

The silicon compounds (b) having at least 3 amino groups per molecule which are bonded to silicon via nitrogen and/or at least 3 oxime groups per molecule which are bonded to silicon via oxygen, may be aminosilanes of the general formula $$R^2_a Si(NR^3_2)_{4-a}$$

or oxime groups of the general formula $$R^2_a Si (O—N{=}Y)_{4-a}$$

or amino-oxime silanes of the general formula $$R^2{}_a Si(ON{=}Y)_b(N{-}R^3{}_2)_{4-a-b}$$

and partial hydrolysates thereof having up to 10 silicon atoms.

In the above formulas, a generally represents 0 or 1, and the sum of a and b does not exceed 3. The examples cited for the radicals represented by $R^1$ are equally applicable for the radicals represented by $R^2$ and $R^3$. Specific examples of $R^2$ radicals are methyl, ethyl, propyl, vinyl and phenyl radicals. Specific examples of $R^3$ radicals are n-butyl, sec-butyl, tert-butyl and the cyclohexyl radicals.

In the above formulas, Y is a $R^4R^5C$-group, where $R^4$ and $R^5$ may be the same as $R^1$, or Y may represent an $R^6C$-group, where $R^6$ represents a bivalent hydrocarbon radical or a bivalent substituted hydrocarbon radical.

Specific examples of a silicon compound having at least 3 amino groups per molecule which are bonded to silicon via nitrogen and/or oxime groups which are bonded to silicon via oxygen are methyltris-(n-butylamio)-silane, methyltris-(sec-butylamino)-silane, methyltris-(cyclohexylamino)-silane, methyltris-(methylethylketoximo)-silane, methylbis-(methylethylketoximo)-cyclohexylaminosilane and methyltris-(acetonooximo)-silane.

The silicon compounds (b) may be used either alone or in admixture with other silicon compounds.

The amount of the silicon compounds (b) present in the composition is preferably adjusted according to the amount of the diorganopolysiloxane (a) in order to ensure the presence of at least 3 amino groups which are bonded to silicon via nitrogen and/or 3 oxime groups which are bonded to silicon via oxygen per molecule for each terminal condensable group in the diorganopolysiloxane (a).

The silicon compound (c) which contains at least one SiC-bonded thiol group is selected from the group consisting of mercapto-functional silanes or mercapto-functional organopolysiloxanes.

The mercapto-functional silanes of compound (c) may be represented by the general formula:

$$SiR^7{}_c R^8{}_d Q_{4-c-d}$$

where Q represents the group $$-(CH_2)_p-SH-$$

and p is an integer having a value of from 1 to 5, and more preferably has a value of 3, $R^7$ is an alkoxy group having from 1 to 5 carbon atoms and more preferably represents a methoxy group; $R^8$ is the same as $R^1$; c is an integer having a value of from 1 to 3; d is an integer having a value of from 0 to 2; and the sum of c+d may not exceed 3.

Siloxanes having at least one SiC-bonded thiol group which may be used in this invention may consist of partial hydrolysates of the above silanes having up to 10 silicon atoms, provided they contain at least one additional condensable group, or condensation products or equilibration products of the mercapto-functional silanes, provided they contain at least one additional condensable group, or hydrolysates thereof with organopolysiloxanes having up to 2000 silicon atoms and at least one additional condensable group.

Diorganopolysiloxane (a) is present in an amount of from about 30 to 98 percent by weight, and more preferably in a amount of from 60 to 80 percent by weight based on the weight of the composition.

Silicon compound (b) is present in an amount of from about 0.2 to about 15 percent by weight and more preferably in an amount of from 1 to 8 percent by weight based on the weight of the composition.

Silicon compound (c) is present in an amount of from about 0.1 to about 20 percent by weight and more preferably in an amount of from about 0.1 to about 5 percent by weight based on the weight of the composition.

In addition to the diorganopolysiloxanes (a), silicon compound (b) and silicon compound (c), the compositions of this invention may also contain such substances as have been added heretofore to organopolysiloxane compositions which crosslink at room temperature to form elastomers. Examples of such additives are reinforcing and non-reinforcing fillers, pigments, soluble dyes, fragrances, organopolysiloxane resins, polyvinyl chloride powder, corrosion-inhibitors, oxidation inhibitors, heat-stabilizers, solvents, adhesives, condensation catalysts such as tin salts or organotin salts of carboxylic acids, such as dibutyltin dilaurate, dibutyltin diacetate or basic nitrogen compounds such as 3-ethoxypropylamine-1 or n-hexylamine, plasticizers such as trimethylsiloxy-terminated dimethylpolysiloxane fluids, or phosphoric acid esters, such as trioleylphosphate, as well as polyglycols and block copolymers of polyglycols and organopolysiloxanes.

Examples of suitable reinforcing fillers are finely dispersed, pyrogenically prepared or precipitated silicic acids having a surface area of at least 50 m²/g, titanium dioxide, iron oxides, aluminum oxide, zinc oxide, carbon black or graphite.

Examples of suitable non-reinforcing fillers are fillers having a surface area of less than 50 m²/g, such as quartz meal, diatomaceous earth, silica, Neuburg chalk, calcium silicate, zirconium silicate or aluminum silicates, including those having molecular sieve properties.

The fillers may be treated in accordance with known processes to impart hydrophobic properties thereto. Mixtures of various reinforcing and/or non-reinforcing fillers may be employed.

In preparing the compositions of this invention, the constituents may be mixed in any desired sequence. It is preferred that the mixing take place at room temperature or at temperatures of less than 150° C. and under anhydrous conditions.

The compositions of this invention crosslink at room temperature when exposed to atmospheric moisture. However, if desired, crosslinking can take place at lower or higher temperatures. When a thin layer of the composition is used, crosslinking may take place rapidly at temperatures up to 200° C. Crosslinking can also be induced in the presence of water which exceed the water content of atmospheric air.

The organopolysiloxane compositions of this invention are particularly useful as putties, as sealants or as coating materials.

The addition of the mercapto-functional silanes or siloxanes to the organopolysiloxane compositions of this invention results in a substantial increase in the length of time before the compositions form a skin on the surface, even though the compositions cure with a comparable speed. Thus, the compositions of this invention are especially useful in screen printing. In certain circumstances, the compositions of this invention may be used to form gaskets, for example, on motor blocks by screen printing.

All parts and percentages in the following examples are by weight unless otherwise specified.

EXAMPLE 1

About 70 parts of a hydroxyl-terminated dimethylpolysiloxane having a viscosity of 18,500 mPa.s at 25° C. are mixed with 21 parts of a trimethylsiloxy-terminated dimethylpolysiloxane having a viscosity of 100 mPa.s at 25° C. and 3.5 parts of a pyrogenically produced silicon dioxide having a surface area of 150 m$^2$/g. About 5.4 parts of methyltris(butanone-2-oximo)-silane are then added to the mixture. Then 0.1 part of dibutyltin diacetate and 0.3 parts of 3-mercaptopropyltrimethoxysilane are subsequently added and mixed under anhydrous conditions.

The product is a flowable composition which may be stored under anhydrous conditions, but when exposed to atmospheric moisture cures to an elastomer.

The time which elapses until skin forms on the surface of this composition is 6 hours at a temperature of 23° C. and at 50 percent relative humidity.

Part of the composition was placed in an 18 mm deep aluminum dish having a diameter of 24 mm, in order to determine the speed with which the composition cured. In a 50 percent relative humidity and at a temperature of 23° C. the composition cured to a depth of about 3.5 mm after 3 days; after 7 days to a depth of about 5.5 mm; and after 14 days it cured to a depth of about 10.0 mm.

COMPARISON EXAMPLE 1

The procedure of Example 1 is repeated, except that the 0.3 parts of 3-mercaptopropyltrimethoxysilane is omitted.

At a temperature of 23° C. and at 50 percent relative humidity, skin formed on the surface after 1 hour.

At a temperature of 23° C. and at a 50 percent relative humidity, the composition cured to a depth of about 4.5 mm after 3 days, after 7 days to a depth of about 6.5 mm and after 14 days to a depth of about 11.0 mm.

EXAMPLE 2

About 83 parts of a hydroxyl-terminated dimethylpolysiloxane having a viscosity of 18,500 mPa.s at 25° C. are mixed with about 12 parts of pyrogenically prepared silicon dioxide which has been treated with a silane to impart hydrophobic properties thereto and has a surface area of 170/m$^2$/g (Product HDK H 2000, manufactured by Wacker-Chemie GmbH). About 4.9 parts of methyltris(butanone-2-oximo)-silane and 0.1 part by weight of dibutyltin diacetate are added to the mixture and mixed under anhydrous conditions. The product, which is identified as composition (A), is a flowable composition that is stable when stored under anhydrous conditions.

The following ingredients are incorporated in the composition:
 (a) 0.5 parts of 3-mercaptopropyltrimethoxysilane; identified as composition (B).
 (b) 0.5 parts dimethyl-3-mercaptopropylmethoxysilane; identified as composition (C).
 (c) 1 part of the product obtained from the reaction of 600 g of a hydroxyl-terminated dimethylpolysiloxane containing 3.7 percent Si-bonded hydroxyl groups, and 200 g of 3-mercaptopropyltrimethoxy silane; identified as composition (D).
 (d) 0.5 parts of a partial hydrolysate of 3-mercaptopropyltrimethoxysilane containing an average of 3 silicon atoms; identified as composition (E).

The following table shows the length of time required before the above compositions developed a skin at a 50 percent relative humidity and at a temperature of 23° C.

TABLE 1

| Composition | Time required before skin formation |
|---|---|
| A (comparison) | 50 minutes |
| B | 8 hours |
| C | 7 hours |
| D | 7 hours |
| E | 8 hours |

EXAMPLE 3

About 83.3 parts of a hydroxyl-terminated dimethylpolysiloxane are mixed with 4.5 parts of methyltris(-butanone-2-oximo)-silane and 12 parts of graphite having a surface area of 70 m$^2$/g. About 0.2 parts of dibutyltin dilaurate and 0.3 parts of 3-mercaptopropyltrimethoxysilane are then added to the mixture.

A slump-proof composition is obtained which is stable when stored under anhydrous conditions.

In the presence of 50 percent atmospheric moisture and at a temperature of 23° C., the composition forms a skin after 8 hours.

When the 3-mercaptopropyltrimethoxysilane is omitted from a similar composition, it forms a skin after 60 minutes.

EXAMPLE 4

The composition described in Example 1 is placed on the surface of a screen printing frame. The section of the screen which is not covered with a film has the shape of a gasket. A doctor blade is then used to imprint motor blocks with the composition to form silicone rubber gaskets having a thickness of 200 microns.

The composition may be used for screen printing for a period of 6 hours without any difficulty and without any indication of crosslinking and skin formation.

After approximately 24 hours at room temperature and at a 50 percent relative humidity, the printed gaskets are cured. When the printed gaskets are placed in a drying chamber at 150° C. and at a high relative humidity, they cure after about 10 minutes.

COMPARISON EXAMPLE 2

The procedure of Example 4 is repeated, except that the composition of Comparison Example 1 is substituted for the composition of Example 1.

Skin formation is observed within one hour and after 1.5 hours the screen is sealed.

What is claimed is:
1. A composition which is stable when stored under anhydrous conditions, but when exposed to atmospheric moisture cures to an elastomer comprising
   (a) a diorganopolysiloxane containing terminal condensable groups;
   (b) a silicon compound having at least 3 groups per molecule selected from the group consisting of amino groups which are bonded to silicon via nitrogen, oxime groups which are bonded to silicon via oxygen and mixtures thereof; and

(c) a silicon compound having at least one thiol group per molecule bonded to silicon via carbon.

2. The composition of claim 1, wherein the diorganopolysiloxane is represented by the formula $$A-(SiR^1{}_2O)_x-SiR^1{}_2A$$

where $R^1$ is selected from the group consisting of monovalent hydrocarbon radicals, substituted monovalent hydrocarbon radicals and polymeric hydrocarbon radicals, A represents condensable groups and x has a value of at least 10.

3. The composition of claim 1 or 2, wherein the condensable groups are selected from the group consisting of hydroxyl groups, amine groups, oxime groups, alkoxy groups having from 1 to 5 carbon atoms, alkoxyalkyleneoxy groups having from 1 to 5 carbon atoms and mixtures thereof.

4. The composition of claim 1, wherein the silicon compound is an aminosilane of the formula $$R^2{}_aSi(NR^3{}_2)_{4-a}$$

where $R^2$ and $R^3$ are each selected from the group consisting of monovalent hydrocarbon radicals, substituted monovalent hydrocarbon radicals and polymeric hydrocarbon radicals, and a is 0 or 1.

5. The composition of claim 1, wherein the silicon compound is an oxime of the formula $$R^2{}_aSi(ON\!=\!Y)_{4-a}$$

where $R^2$ is selected from the group consisting of monovalent hydrocarbon radicals, substituted monovalent hydrocarbon radicals and polymeric hydrocarbon radicals, Y is selected from the group consisting of $R^4R^5C$-group and $R^6C$-group where $R^4$ and $R^5$ are selected from the group consisting of monovalent hydrocarbon radicals, substituted monovalent hydrocarbon radicals and polymeric hydrocarbon radicals, $R^6$ is selected from the group consisting of bivalent hydrocarbon radicals and bivalent substituted hydrocarbon radicals and a is 0 or 1.

6. The composition of claim 1, wherein the silicon compound is an amino-oxime silane of the formula $$R^2{}_aSi(ON\!=\!Y)_b(NR^3{}_2)_{4-a-b}$$

where $R^2$ and $R^3$ are selected from the group consisting of monovalent hydrocarbon radicals, substituted monovalent hydrocarbon radicals and polymeric hydrocarbon radicals, Y is selected from the group consisting of $R^4R^5C$-group and $R^6C$-group where $R^4$ and $R^5$ are selected from the group consisting of monovalent hydrocarbon radicals, substituted monovalent hydrocarbon radicals and polymeric hydrocarbon radicals, $R^6$ is selected from the group consisting of bivalent hydrocarbon radicals and bivalent substituted hydrocarbon radicals, a is 0 or 1 and the sum of a+b does not exceed 3.

7. The composition of claim 1, wherein the silicon compound having at least one thiol group per molecule is selected from the group consisting of mercapto-functional silanes of the formula $$Si\,R^7{}_c\,R^8{}_d\,Q_{4-c-d}$$

where $R^7$ is an alkoxy group having from 1 to 5 carbon atoms, $R^8$ is selected from the group consisting of monovalent hydrocarbon radicals, substituted monovalent hydrocarbon radicals and polymeric hydrocarbon radicals, Q is a group of the formula $$(CH_2)_p-SH-,$$

c has a value of from 1 to 3, d has a value of from 0 to 2, the sum of c+d may not exceed 3 and p has a value of from 1 to 5, and siloxanes having at least one SiC-bonded thiol group per molecule and at least one condensable group.

8. The composition of claim 1, wherein the diorganopolysiloxane (a) is present in an amount of from 30 to 98 percent by weight based on the weight of the composition.

9. The composition of claim 1, wherein the silicon compound (b) is present in an amount of from 0.2 to 15 percent by weight based on the weight of the composition.

10. The composition of claim 1, wherein the silicon compound (c) is present in an amount of from 0.1 to 20 percent by weight based on the weight of the composition.

11. A screen printing process which comprises applying to a screen printing frame a composition containing
(a) a diorganopolysiloxane having terminal condensable groups;
(b) a silicon compound havng at least 3 groups per molecule selected from the group consisting of amino groups which are bonded to silicon via nitrogen, oxime groups which are bonded to silicon via oxygen and mixtures thereof; and
(c) a silicon compound having at least one thiol group per molecule bonded to silicon via carbon;
inprinting the pattern on a substrate and thereafter curing the printed pattern in the presence of moisture.

12. The process of claim 11, wherein the printed pattern is cured at an elevated temperature in the presence of moisture.

* * * * *